(12) United States Patent
Supino et al.

(10) Patent No.: US 8,078,401 B2
(45) Date of Patent: Dec. 13, 2011

(54) METHOD OF PERSONAL NAVIGATION USING STRIDE VECTORING

(75) Inventors: Ryan Supino, Loretto, MN (US); Robert D. Horning, Savage, MN (US)

(73) Assignee: Honeywell International Inc., Morristown, NJ (US)

( * ) Notice: Subject to any disclaimer, the term of this patent is extended or adjusted under 35 U.S.C. 154(b) by 994 days.

(21) Appl. No.: 12/019,368

(22) Filed: Jan. 24, 2008

(65) Prior Publication Data

US 2009/0326795 A1 Dec. 31, 2009

Related U.S. Application Data

(60) Provisional application No. 60/973,304, filed on Sep. 18, 2007.

(51) Int. Cl.
G01C 25/00 (2006.01)
G01C 17/38 (2006.01)
G01C 21/00 (2006.01)

(52) U.S. Cl. .......... 701/220; 701/200; 701/300; 702/94; 702/95

(58) Field of Classification Search .......... 701/300, 701/214, 220, 1, 200, 302, 204; 702/92, 702/93, 94, 95, 85, 97, 127, 150, 151; 342/463, 342/450; 73/1.37, 1.75, 1.77, 1.81, 489, 73/514.01; 33/351, 702; 235/105
See application file for complete search history.

(56) References Cited

U.S. PATENT DOCUMENTS

| | | | | |
|---|---|---|---|---|
| 4,703,445 | A * | 10/1987 | Dassler | 702/160 |
| 6,614,352 | B2 * | 9/2003 | Pellet et al. | 340/573.1 |
| 6,711,517 | B2 * | 3/2004 | Brunstein | 702/94 |
| 7,421,340 | B2 * | 9/2008 | Ladetto et al. | 701/207 |
| 2002/0091482 | A1 * | 7/2002 | Eakle et al. | 701/207 |
| 2002/0143491 | A1 * | 10/2002 | Scherzinger | 702/160 |
| 2004/0095276 | A1 | 5/2004 | Krumm et al. | |
| 2008/0204223 | A1 * | 8/2008 | Chu et al. | 340/539.13 |
| 2009/0073045 | A1 | 3/2009 | Supino et al. | |

FOREIGN PATENT DOCUMENTS

DE 10310857 9/2004

(Continued)

OTHER PUBLICATIONS

Bronez, Thomas, "Mulitsensor Dead Reckoning for Personal Navigation", "2007 WPI PPL Workshop", Aug. 6, 2007, Publisher: MITRE Technology Program.
Saarinen et al., "Personal Navigation System", Sep. 2004, pp. 212-217, vol. 1, Publisher: IEEE.

(Continued)

*Primary Examiner* — Thomas Black
*Assistant Examiner* — Christine Behncke
(74) *Attorney, Agent, or Firm* — Fogg & Powers LLC

(57) ABSTRACT

A method of error compensation for an inertial measurement unit is provided. The method comprises providing a first object including an inertial measurement unit, providing a second object proximal to the first object, and determining an initial position and orientation of the first object. A motion update is triggered for the inertial measurement unit when the second object is stationary with respect to a ground surface. At least one position vector is measured between the first object and the second object when the first object is in motion and the second object is stationary. A distance, direction, and orientation of the second object with respect to the first object are calculated using the at least one position vector. An error correction is then determined for the inertial measurement unit from the calculated distance, direction, and orientation of the second object with respect to the first object.

10 Claims, 5 Drawing Sheets

FOREIGN PATENT DOCUMENTS

| | | |
|---|---|---|
| EP | 1022583 | 7/2000 |
| FR | 2853221 | 10/2004 |
| GB | 2332052 | 6/1999 |
| WO | 03062850 | 7/2003 |

OTHER PUBLICATIONS

Brand et al., "Foot-to-Foot Range Measnurement as an Aid to Personal Navigation", "CIGTF 22nd Guidance Test Symposium", Jun. 23, 2003, pp. 113-121, Publisher: ION 59th Annual Meeting, Published in: Albuquerque, NM US.

* cited by examiner

METHOD OF PERSONAL NAVIGATION USING STRIDE VECTORING

This application claims the benefit of priority to U.S. Provisional Patent Application Ser. No. 60/973,304, filed on Sep. 18, 2007, the disclosure of which is incorporated herein by reference.

CROSS-REFERENCE TO RELATED APPLICATIONS

This application is related to copending U.S. application Ser. No. 12/019,363, and entitled "GROUND CONTACT SWITCH FOR PERSONAL NAVIGATION SYSTEM," the disclosure of which is incorporated herein by reference.

This application is also related to copending U.S. application Ser. No. 12/019,380, and entitled "ULTRASONIC MULTILATERATION SYSTEM FOR STRIDE VECTORING," the disclosure of which is incorporated herein by reference.

BACKGROUND

Personal navigation systems capable of providing highly accurate location information in global positioning system (GPS) denied environments or GPS-disrupted environments are sought after for military, first responder, and consumer applications. These personal navigation systems need to provide accurate position information when GPS is unavailable or unreliable for long periods of time (e.g., hours to days). GPS interruption can occur due to GPS line-of-sight blockage (e.g., buildings, forest canopy, caves, etc.) or due to electrical interference/jamming.

Typically, personal navigation systems use an inertial measurement unit (IMU), or some subset of inertial sensors, to measure changes in position and heading to track the movement of a person, ground vehicle, or air vehicle. Since IMU errors accumulate rapidly, additional sensors such as a compass, pressure sensor, or velocity sensors are added to constrain error growth and drift. Furthermore, algorithms based on motion classification or zero velocity update (ZUPT) are used to compensate and constrain distance error growth, but do not adequately constrain heading error. In order to bound heading errors a compass is often used with the ZUPT, however, compass accuracy still results in limited position performance and is inadequate for long, precise GPS-denied missions. Vision-based systems, using either optical flow or image/landmark recognition, can compensate for heading error, but tend to be computationally demanding.

Personal dead reckoning systems for navigating in GPS-denied environments have also been developed. Such systems, which are based on a fusion of inertial sensors, a compass, and a pressure sensor, are limited in accuracy to about 1-5% error over distance traveled. Distance error typically accounts for about 30% of total position error and heading error accounts for about 70% of the total position error.

SUMMARY

The present invention relates to a method of error compensation for an inertial measurement unit. The method comprises providing a first object including an inertial measurement unit, providing a second object proximal to the first object, and determining an initial position and orientation of the first object. A motion update is triggered for the inertial measurement unit when the second object is stationary with respect to a ground surface. At least one position vector is measured between the first object and the second object when the first object is in motion and the second object is stationary. A distance, direction, and orientation of the second object with respect to the first object are calculated using the at least one position vector. An error correction is then determined for the inertial measurement unit from the calculated distance, direction, and orientation of the second object with respect to the first object.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
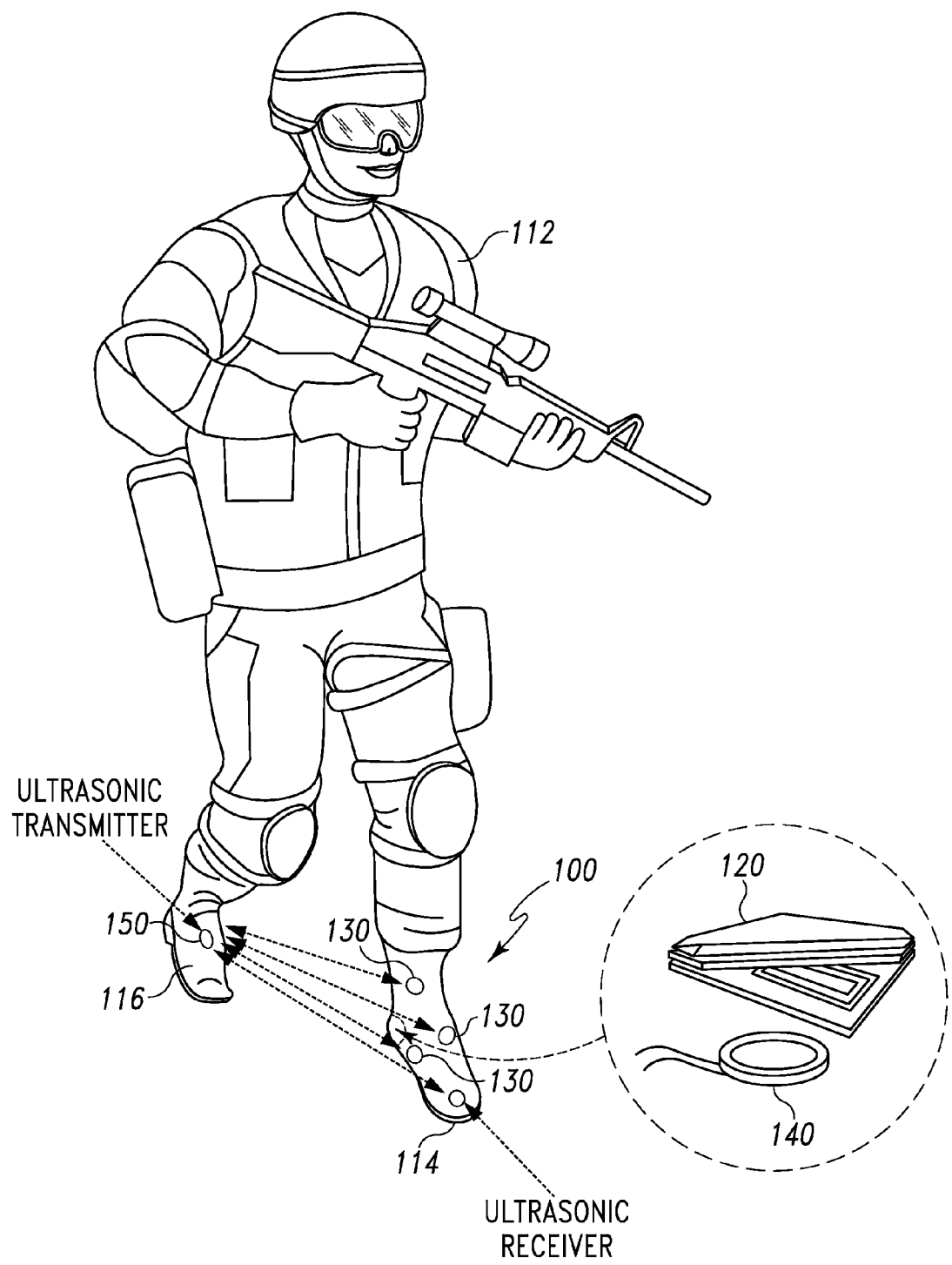
FIG. 1 illustrates a personal navigation system that implements a stride vector technique according to one embodiment.

In the following detailed description, embodiments are described in sufficient detail to enable those skilled in the art to practice the invention. It is to be understood that other embodiments may be utilized without departing from the scope of the present invention. The following detailed description is, therefore, not to be taken as limiting.

The present invention is directed a method of personal navigation using stride vectoring. The present method can be used for error compensation of an inertial measurement unit (IMU) such as used in a personal navigation system. The present method can also be used for primary navigation by providing navigation error corrections to a navigation system, which can optionally include an IMU for back-up.

The present method can be used in personal navigation systems for both military and civilian applications. For example, the method can be used in personal navigation systems for soldiers, first responder personnel (e.g., fire, rescue, police), consumer applications, and the like. The present method can also be used in navigation systems for robots that "walk" such as humanoid robots or other multi-leg robots.

In general, the method employs a stride vector technique for a pair of first and second objects, such as a pair of boots or shoes worn by a user and integrated with a personal navigation system for the user. In another implementation the objects can be robot feet integrated with a navigation system for a robot.

In a method of error compensation for an IMU, a first object includes the IMU, and a second object proximal to the first object can optionally include an IMU. An initial position and orientation of the first object is determined. A motion update is triggered for the IMU when the second object is stationary with respect to a ground surface. At least one position vector is measured between the first object and the second object when the first object is in motion and the second object is stationary. A distance, direction, and orientation of the second object with respect to the first object are calculated using the at least one position vector. An error correction is then determined for the IMU from the calculated distance, direction, and orientation of the second object with respect to the first object.

In one implementation for IMU error compensation, the at least one position vector comprises a first position vector measured from the first object to the second object at a first time, and a second position vector measured from the first object to the second object at a second time that is later than the first time. In another implementation for IMU error compensation, the at least one position vector comprises a first position vector measured from the first object to the second object in a coordinate reference frame of the first object, and a second position vector measured from the second object to the first object in a coordinate reference frame of the second object, with the first and second position vectors being measured substantially simultaneously.

The present method provides significant improvement in the performance of personal navigation systems that use an IMU by compensating for both distance and heading error growth in the IMU. The stride vector technique provides accurate measurement of stride length, and provides position correction updates during motion that effectively constrain both distance and heading error growth, which reduces final position error in the IMU.

In the present method, a position vector between a user's feet is measured at one time or multiple times per step. The position vector measurements are used to compensate for position error in the IMU. Since the position vector provides both distance magnitude and direction, it can compensate for IMU heading error as well as distance error.

When the stride vector technique is used in conjunction with a zero velocity update (ZUPT) algorithm, IMU corrections can be provided when a user's foot is stationary as well as when the foot is in motion. The IMU in the moving foot can be updated during the moving portion of the stride (a motion update, or MUPT). The ZUPT algorithm corrects IMU errors while the foot is stationary. As with the ZUPT, a MUPT requires knowledge of when one foot is stationary.

In using the present method for primary personal navigation, a first position vector is measured from a first object to a second object in a coordinate reference frame of the first object, and a second position vector is measured from the second object to the first object in a coordinate reference frame of the second object. A distance, direction, and orientation of the second object with respect to the first object are calculated using the first and second position vectors. A corrected path for navigation is determined from the calculated distance, direction, and orientation of the second object with respect to the first object. In this method, an IMU can be optionally used to aid in the correction of position, heading, and distance errors while the first object is in motion. When the IMU is not used, a lower performing, but very low cost navigation system can be provided based on this stride vector technique alone. For example, if one were walking indoors, there would be little environmental effects. This would allow for navigation error correction without the use of an IMU by adding successive stride vectors.

The present stride vectoring method can be implemented by providing transmitters and receivers in footwear worn by a user such as shoes or boots. The transmitters and receivers are used to measure a position vector between both feet during walking or running. The stride vectoring method can also utilize foot or leg mounted sensors capable of measuring a position vector between one stationary foot (or leg) and the other. The vector measurement can be made using a trilateration or multilateration system, or a radar system (ultra-wideband, phased array, etc.), by using ultrasonic signals, radio frequency signals, optical signals, or a laser beam. The stride vectoring method can be implemented by software run by a processor that is part of a personal navigation system.

The present stride vector technique is described hereafter in further detail with respect to the drawings.

FIG. 1 illustrates a personal navigation system 100 that implements a stride vector technique according to one embodiment. The personal navigation system 100 generally includes a GPS, an IMU, and other optional features. In one embodiment, the ISA can include micro-electro-mechanical systems (MEMS) gyroscopes and accelerometers that are integrated onto a single, six degree-of-freedom (DOF) chip, which is copackaged with a processor such as an application-specific integrated circuit (ASIC) to produce the chipscale ISA. A stride vectoring algorithm and a ZUPT algorithm can be programmed into the ASIC. Optional features for personal navigation system 100 can include a three-dimensional magnetic compass, barometric altimeter, temperature sensor, motion classification, and a stride vectoring system.

As shown in FIG. 1, a user 112 is wearing a left boot 114 containing an IMU 120, a plurality of non-collinear ultrasonic receivers 130, and a ground contact switch 140. A right boot 116 of user 112 has an ultrasonic transmitter 150 in operative communication with receivers 130, and a ground contact switch (not shown). Although FIG. 1 illustrates that user 112 is a soldier, it should be understood that system 100 can be used by other types of personnel such as first responders, or consumers.

In an alternative embodiment, a navigation system similar to personal navigation system 100 can be incorporated into the feet of a robot that walks. Such a navigation system for the robot generally includes one or more ultrasonic transmitters, ultrasonic receivers, one or more ground contact switches, one or more IMUs, and a GPS.

Exemplary ground contact switches that can be used in personal navigation system 100 are described in further detail in copending U.S. application Ser. No. 12/019,363, and entitled "GROUND CONTACT SWITCH FOR PERSONAL NAVIGATION SYSTEM."

The stride vector technique provides both heading and distance information, and is performed only between the stationary foot and the moving foot with inertial sensors (IMU foot). When the non-IMU foot (anchor foot) is determined to be stationary, the system performs position measurements to the IMU foot. These position measurements will occur a few times as the IMU foot swings through its stride. Changes in position of the IMU foot with respect to the anchor foot are used to provide distance and heading corrections to the IMU to compensate for position errors. When the IMU foot is determined to be stationary, a ZUPT can be performed to compensate for accelerometer and gyroscope (not in the heading axis) drift. Combining the motion update with ZUPT provides the unique capability of being able to compensate for IMU errors during the majority of the IMU foot stride.

The present stride vector method provides for non-zero-velocity (motion) IMU error correction. In stride vectoring, while one foot is stationary and the other foot is moving, the position vector between the two can be measured using techniques such as trilateration or multilateration. Trilateration uses three receivers, whereas multilateration uses four or more receivers. In trilateration, the three receivers measure the time of arrival (TOA) of a pulse from the transmitter. Each TOA measurement locates the transmitter on a spherical surface. The intersection of the three distinct spheres produces a point in space where the transmitter can be found. The position, monitored over time, includes both rotation and translation information.

Multilateration is implemented in a similar manner as described above for trilateration, except that time-difference-of-arrival (TDOA) measurements are used between receiver pairs. The TDOA measurements between pairs of receivers locate the transmitter on a hyperboloid surface, instead of a spherical surface in the case of trilateration. Further details related to trilateration and multilateration systems are described in copending U.S. application Ser. No. 12/019,380, and entitled "ULTRASONIC MULTILATERATION SYSTEM FOR STRIDE VECTORING."

Figure 2:
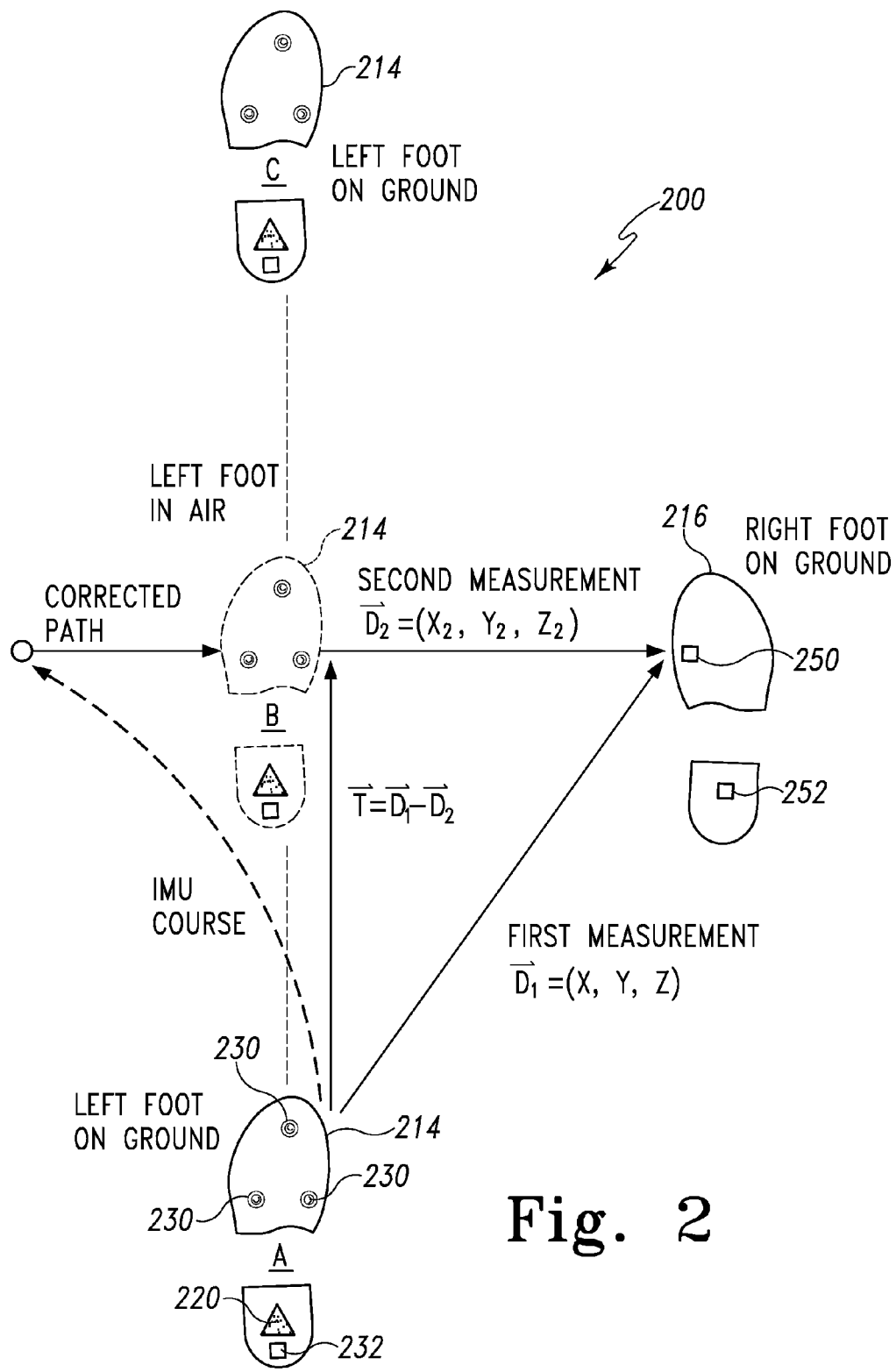
FIG. 2 is a schematic diagram of a stride vector technique according to one embodiment.

FIG. 2 is a schematic diagram showing a stride vector technique 200 using trilateration according to one embodiment for IMU error compensation. A left boot or shoe 214 contains an IMU 220, three (or more) receivers 230, and a ground contact switch 232. A right boot or shoe 216 has a transmitter 250 and a ground contact switch 252.

A full-stride compensation using stride vector technique 200 is carried out as follows. When the right foot is on the ground, ground contact switch 252 signals that right boot or shoe 216 is in a stationary state and triggers a motion update. As the left foot swings through its stride, from position A (on ground) to position B (in air) and ending at position C (on ground), a stride vector between the stationary foot and the moving foot is accurately measured several times by trilateration. For example, as shown in FIG. 2, a first vector measurement ($\vec{D}_1=(X, Y, Z)$) can be taken at the beginning of the stride adjacent to position A, and a second vector measurement ($\vec{D}_2=(X_2, Y_2, Z_2)$) can be taken at position B. The difference between these vector measurements ($\vec{T}=\vec{D}_1-\vec{D}_2$) is used to compensate for IMU course error during the motion portion of the stride to provide a corrected path. When the left foot is on the ground at position C, ground contact switch 232 can signal that boot 214 is in a stationary state and trigger a ZUPT correction. The stride vector technique 200 allows the IMU to be self calibrated during intervals in which it is stationary using the ZUPT correction as well as during motion using the motion update.

The stride vectors include both heading and distance information. The stride vectors for each footstep can be continuously added to give changes in position and heading, thereby compensating for errors in the IMU along a path. In addition, the IMU is corrected for position, heading and distance errors multiple times per step. The position errors are randomly distributed, so error growth will occur in a random walk fashion, or as the square root of the total number of steps.

The position information obtained from the stride vectoring method can be integrated with a navigation algorithm (e.g., Honeywell's ECTOS IIC software), thereby providing a high accuracy navigation solution in GPS-denied and GPS-limited environments. When accurate stride vectoring information is not available, the navigation system is still able to provide accurate foot ranging data that can be useful in compensating for IMU error growth.

Figure 3:
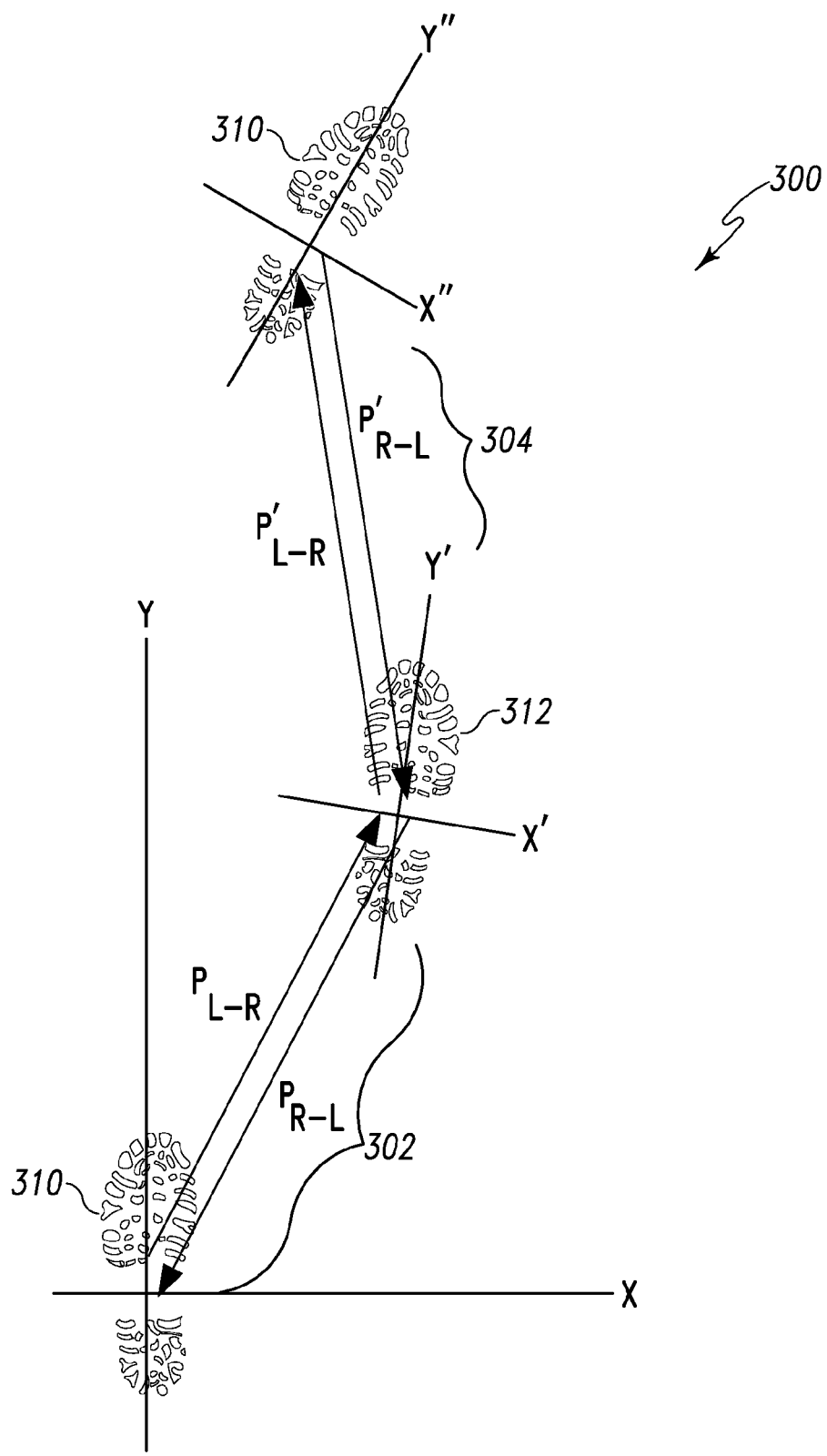
FIGS. 3 and 4 are schematic diagrams showing a stride vector technique according to another embodiment.
Figure 4:
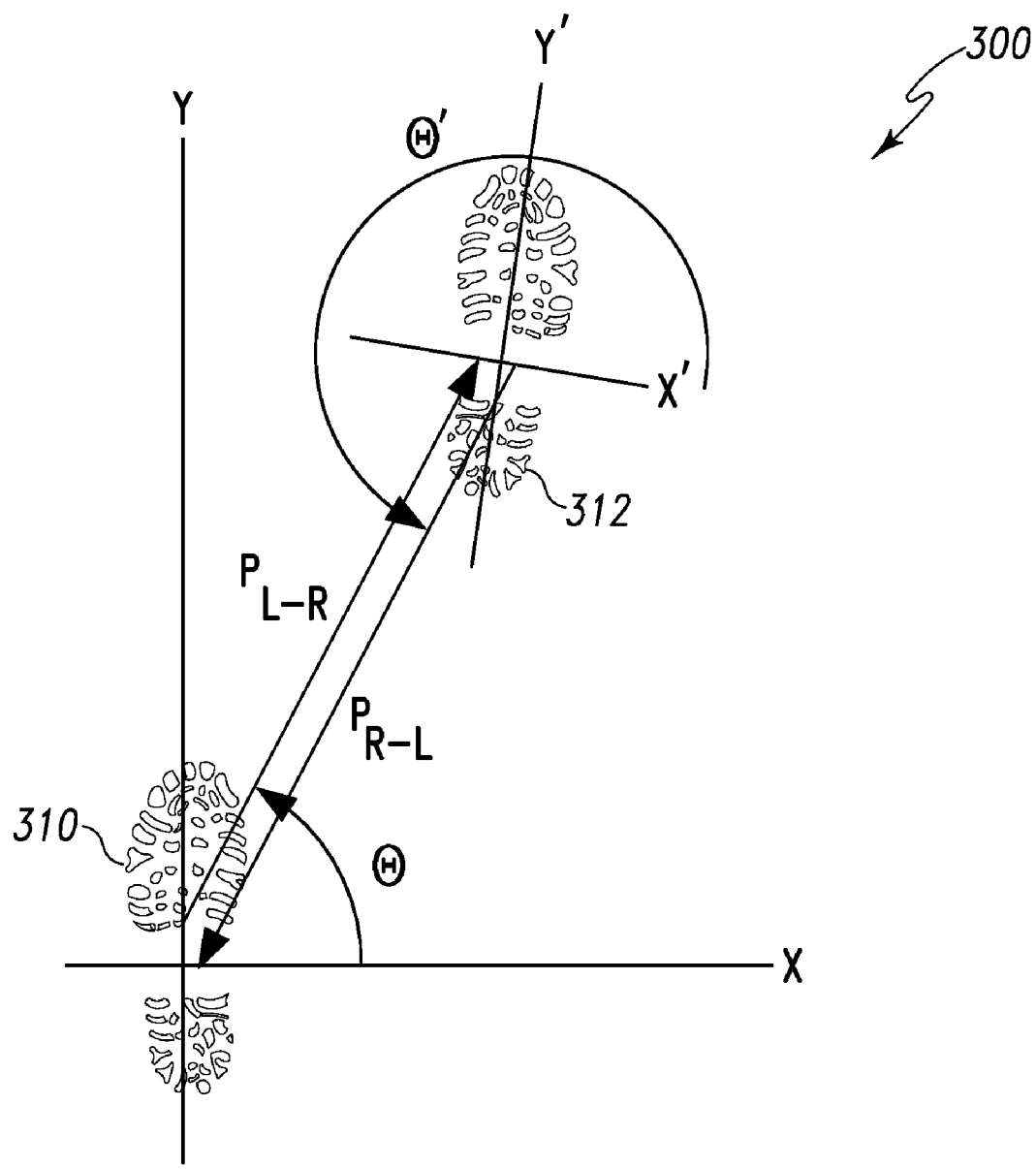

FIGS. 3 and 4 are schematic diagrams showing a stride vector technique 300 according to another embodiment. The stride vector technique 300 can be used for IMU error compensation, or can be used for primary navigation by providing navigation error corrections to a navigation system. The drawings of FIGS. 3 and 4 are in two dimensions so that the stride vectoring concept can be more easily described. A person skilled in the art will recognize that the stride vectoring concept is equally valid in the more realistic 3-dimensional case.

At an initial step 302 (FIG. 3), a first vector $P_{L-R}$ is measured from left (L) foot 310 to right (R) foot 312 in a first reference frame (X, Y, Z) of L foot 310. A second vector $P_{R-L}$ from R foot 312 to L foot 310 is measured in the reference frame (X', Y', Z') of R foot 312. The distance between R foot 312 and L foot 310 is given by the magnitude of each vector, and to get a better number, the average of the two vectors can be computed. Each vector also gives directional information, so the vector $P_{L-R}$ gives the direction of R foot 312 in the coordinate frame of L foot 310. The vector $P_{R-L}$ gives the direction of L foot 310 in the coordinate frame of R foot 312. Using both directions, one can determine the orientation and rotation of R foot 312 with respect to L foot 310.

In a next step 304, a third vector $P'_{L-R}$ is measured from R foot 312 to L foot 310 in the reference frame (X', Y', Z') of R foot 312. A second vector $P'_{R-L}$ from L foot 310 to R foot 312 is measured in the reference frame (X", Y", Z") of L foot 310. Adding the second and third vectors provide the L-to-R distance, direction, and orientation of L foot 310 at next step 304. The above sequence is repeated for each subsequent step to provide error correction for the IMU. The vector measurements define the coordinate frame transformation between the successive steps.

As shown in FIG. 3, complimentary stride vector measurements—one in the reference frame of each foot (left and right)—enable calculation of the vector and relative orientation between the feet. Adding the vectors step by step results in a final position with respect to the initial position and orientation. The transformation matrix from one reference frame (i.e., one step) to the next is completely determined by these two vectors. Therefore, this stride vector technique provides both position and heading, unlike most other IMU-aiding sensors or techniques (e.g., ZUPT, general velocity sensors, etc.).

As depicted in FIG. 4, the stride vector $P_{L-R}$ measures the distance and orientation (θ) from L foot 310 to R foot 312. The stride vector $P_{R-L}$ measures the distance and orientation (θ') from R foot 312 to L foot 310. The distances should be the same in both measurements and are averaged to minimize measurement errors. The orientations θ and θ' can be used to calculate the direction from L foot 310 to R foot 312, and also the orientation of R foot 312 with respect to the orientation of L foot 310.

In the stride vector technique shown in FIGS. 3 and 4, a two-way vector measurement is made between two feet. These measurements are used to calculate relative distance, direction, and orientation of the two feet. If the location and orientation of the first foot is known in the navigation frame, then the second foot can be determined in the navigation frame. Subsequent steps can be related to the navigation frame in the same way. By adding each stride vector, the entire path in the navigation frame can be determined. Errors in both distance and heading are due to random measurement inaccuracy in each step. Such errors grow in a relatively slow, random walk fashion, proportional to $N^{1/2}$, where N is the number of steps. The stride vector position measurements provide information in the navigation frame and help constrain heading error.

Figure 5:
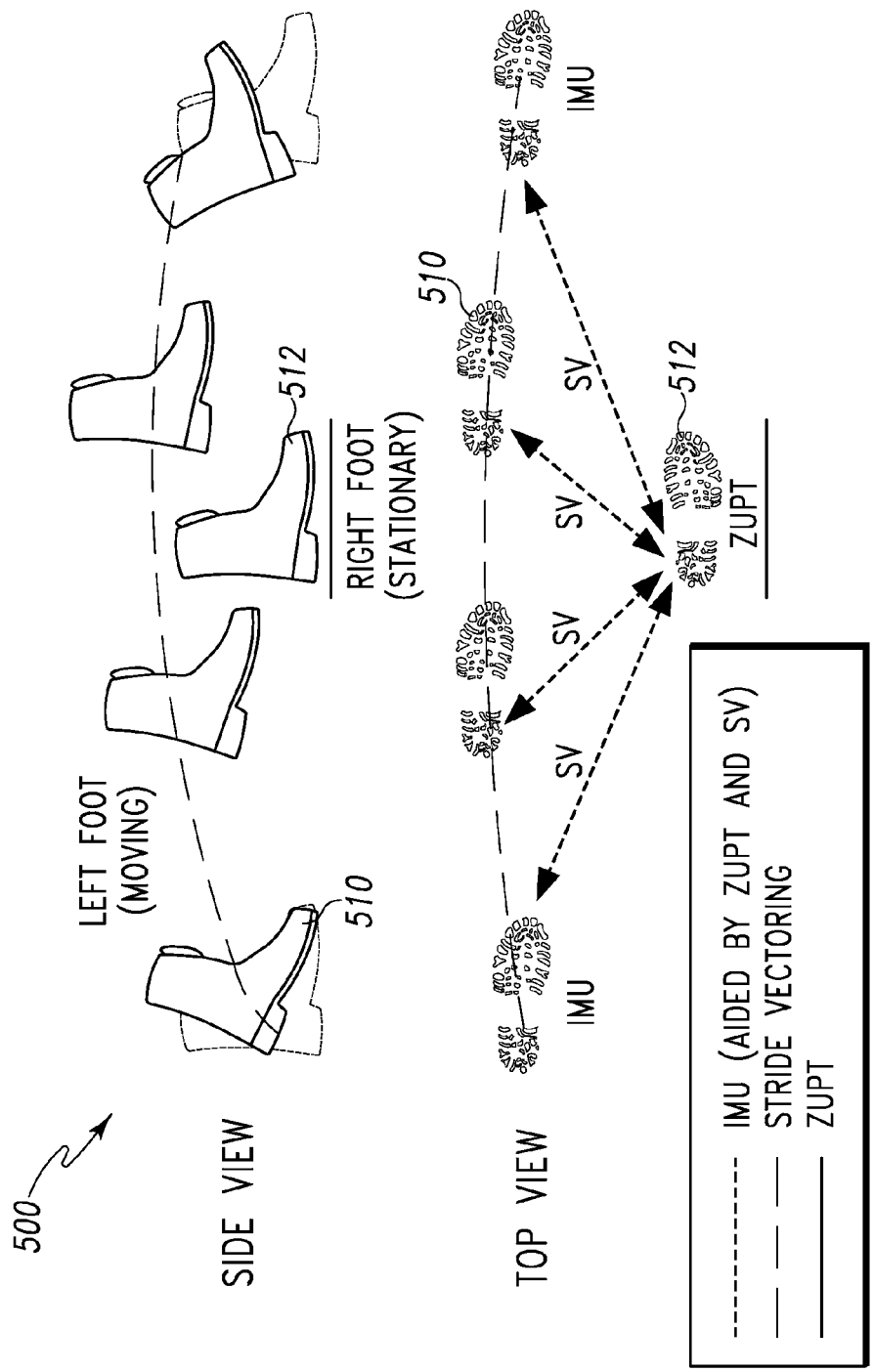
FIG. 5 schematically illustrates a top and side view of a stride during use of a personal navigation system that implements a stride vector technique.

FIG. 5 illustrates a stride 500 during use of a personal navigation system that implements a stride vectoring method in combination with ZUPT and IMU outputs. The side view of FIG. 5 shows that a left foot 510 is moving while a right foot 512 is stationary. As shown in the top view, the stride vectors (SV) can be measured over the majority of the stride, and multiple stride vectors (two-way) can be measured in a single step. The stride vector technique provides the smallest error growth when it is available. The ZUPT is used while the right foot 512 is stationary. Small intervals at the beginning and end of the step require IMU measurement. Since these intervals are short, and since the IMU is frequently compensated for by using ZUPTs and stride vectors, the IMU errors are minimized.

During prolonged stride vector interruptions a Kalman filter can be used to determine the sensor combination providing the lowest navigation error. Modeling can be used to determine the optimum update rate.

In some implementations, where a higher performance is not required, a navigation system can include the stride vectoring method using the two-way vector measurement, with no inertial sensors. Alternatively, an IMU can be used as a back-up in such a system, with the IMU not being used for primary navigation.

Instructions for carrying out the various process tasks, calculations, and generation of signals and other data used in the operation of the method of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs), or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, and the like, which perform particular tasks or implement particular abstract data types. These represent examples of means for executing steps of the method disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of error compensation for an inertial measurement unit, the method comprising:
   providing a first object including a first inertial measurement unit;
   providing a second object proximal to the first object;
   determining an initial position and orientation of the first object;
   triggering a motion update for the first inertial measurement unit when the second object is stationary with respect to a ground surface;
   measuring at least one position vector between the first object and the second object when the first object is in motion and the second object is stationary;
   calculating a distance, direction, and orientation of the second object with respect to the first object using the at least one position vector; and
   determining an error correction for the inertial measurement unit from the calculated distance, direction, and orientation of the second object with respect to the first object.

2. The method of claim 1, wherein the first and second objects comprise footwear.

3. The method of claim 1, wherein the first and second objects comprise robot feet.

4. The method of claim 1, wherein the at least one position vector comprises:
   a first position vector measured from the first object to the second object at a first time; and
   a second position vector measured from the first object to the second object at a second time that is later than the first time.

5. The method of claim 4, further comprising determining a difference between the first and second position vectors while the first object is in motion.

6. The method of claim 1, wherein the second object includes a second inertial measurement unit.

7. The method of claim 6, wherein the at least one position vector comprises:
   a first position vector measured from the first object to the second object in a coordinate reference frame of the first object; and
   a second position vector measured from the second object to the first object in a coordinate reference frame of the second object;
   wherein the first and second position vectors are measured substantially simultaneously.

8. The method of claim 1, wherein the first inertial measurement unit is corrected for position, heading, and distance errors multiple times while the first object is in motion.

9. The method of claim 8, further comprising triggering a zero velocity update correction for the first inertial measurement unit when the first object is stationary.

10. The method of claim 1, wherein the method is partially implemented by a computer readable medium in a personal navigation system.

* * * * *